UNITED STATES PATENT OFFICE.

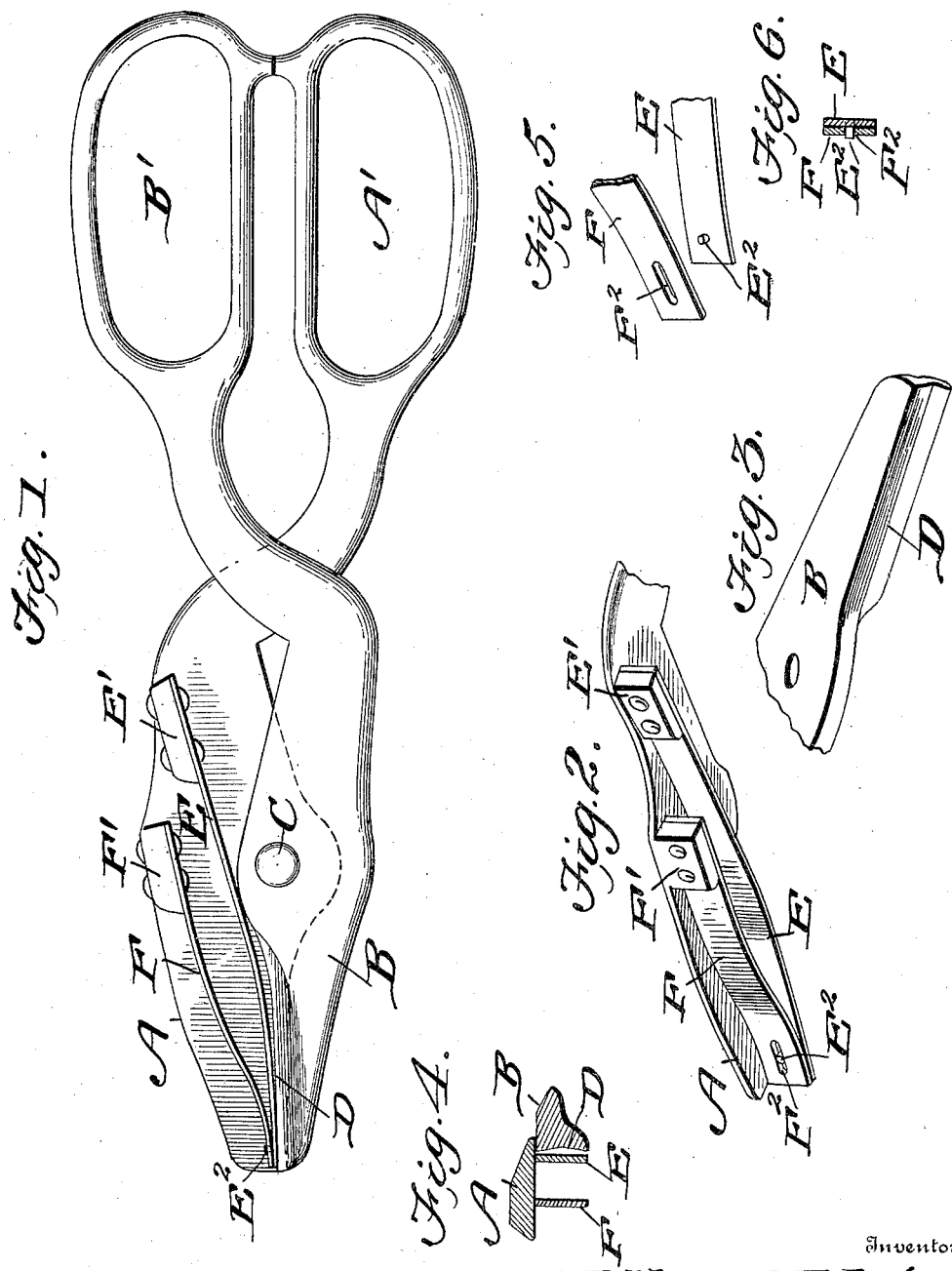

WILLIAM WELCH, OF MOSSPOINT, MISSISSIPPI.

SHEARS.

SPECIFICATION forming part of Letters Patent No. 726,384, dated April 28, 1903.

Application filed May 10, 1902. Serial No. 106,747. (No model.)

*To all whom it may concern:*

Be it known that I, WILLIAM WELCH, a citizen of the United States, residing at Mosspoint, in the county of Jackson and State of Mississippi, have invented a new and useful Shears, of which the following is a specification.

This invention relates generally to shears, and more particularly to a pair of shears particularly adapted for cutting fruit, the object being to provide a pair of shears capable of severing the stem of the fruit and simultaneously gripping said stem at the time it is severed.

Another object is to provide a pair of shears of such construction that they may be manipulated with one hand for the purpose of cutting or severing the stem, gripping the same, and depositing the fruit in the proper gathering-receptacle.

With these objects in view the invention consists, essentially, of a pair of cutting-jaws or blades provided with suitable operating-handles, one jaw or blade being broadened to provide a gripping-surface, the other jaw being provided with a spring-actuated gripping-finger to contact with the broadened portion of the opposing jaw for the purpose of gripping the stem and holding the fruit after the stem has been severed.

The invention consists also in certain details of construction and novel combination and arrangement of parts, as will be fully described hereinafter, and pointed out in the claim.

In the drawings forming a part of this specification, Figure 1 is a side elevation of a pair of shears constructed in accordance with my invention. Fig. 2 is a detail perspective view illustrating the construction and arrangement of the gripping-finger and spring-plate pressing thereon. Fig. 3 is a detail perspective view of the broadened cutting-blade. Fig. 4 is a detail sectional view showing the relative position of the jaws and gripping portions. Fig. 5 is a detail perspective view illustrating the ends of the gripping-finger and the pressing spring-plate, and Fig. 6 is a detail sectional view taken through the ends of said finger and plate.

In carrying out my invention I employ the cutting blades or jaws A and B, provided with handles A' and B', respectively, by means of which the said jaws or blades are operated in substantially the same manner as the ordinary pair of shears, said blades being pivoted at C in the usual manner.

The blade B is made considerably wider at its upper edge and is longitudinally grooved or concaved, as shown at D, in order to provide a wide gripping-surface. The gripping-finger E is attached to a lug E', carried upon the blade or jaw A, preferably at a point in the rear of the pivot, said gripping-finger extending forwardly to the end of the blade or jaw A and normally contacting with the broad and concaved gripping-surface of the blade or jaw B when the cutting edges of the said blades are brought together.

A spring-plate F, attached to a lug F', also carried upon the jaw or blade A, presses at its free end upon the free end of the gripping-finger E, and in practice I prefer to provide the finger with a pin $E^2$, which works in the longitudinal slot $F^2$, produced in the spring-plate F, said slot permitting the lateral movement of the gripping-finger and spring-plate upon each other.

In operation the jaws or cutting-blades are worked in substantially the same manner as ordinary cutting blades or shears through the medium of the handles A' and B', and as the cutting edges of the said shears or blades work past each other, as indicated in Fig. 4, the gripping-finger E will press upon the stem which is being severed and bind it tightly against the broad or concaved portion D, thereby securely holding the stem of the severed fruit between said finger and gripping-surface D, and while the fruit is so held it can be deposited in the basket or other receptacle by simply separating the jaws through the medium of the handles, and it will be distinctly understood that these jaws are so constructed and arranged that they may be manipulated with one hand for the purpose of carrying out all of the various operations herein mentioned.

The spring-plate F, constantly bearing upon the gripping-finger E, always provides a sufficient tension to grip the stem of the severed fruit, and by having a longitudinal slot in the end of said plate a limited movement of the gripping-finger and plate is permitted so as to accommodate various sizes of stems.

Having thus fully described my invention, what I claim as new, and desire to secure by Letters Patent of the United States, is—

A device of the kind described consisting of a pair of pivoted cutting jaws or blades, one of which is provided with a broad gripping-surface longitudinally concaved, a gripping-finger carried by the other jaw or blade, a spring-plate carried also by the jaw or blade and bearing at its free end upon the free end of the gripping-finger, said gripping-finger carrying a pin adapted to work in the longitudinal slot produced in the spring-plate for the purpose specified.

WILLIAM WELCH.

Witnesses:
SAMUEL S. HENRY,
LOREN A. MORRIS.